United States Patent
Li et al.

(10) Patent No.: US 7,374,233 B2
(45) Date of Patent: May 20, 2008

(54) LIGHTWEIGHT INTEGRAL CORROSION-RESISTANT FRONT-END STRUCTURE FOR A VEHICLE

(75) Inventors: Naiyi Li, Ann Arbor, MI (US); Michael Maj, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 11/537,059

(22) Filed: Sep. 29, 2006

(65) Prior Publication Data

US 2008/0079290 A1   Apr. 3, 2008

(51) Int. Cl.
*B60R 27/00* (2006.01)

(52) U.S. Cl. .......................... 296/203.02; 296/193.09; 296/198

(58) Field of Classification Search ........... 296/193.09, 296/198, 203.02, 187.09; 411/531–547
See application file for complete search history.

(56) References Cited

U.S. PATENT DOCUMENTS

| | | | |
|---|---|---|---|
| 2,606,625 | A | 8/1952 | Paton |
| 6,224,809 | B1 | 5/2001 | Orndorff, Jr. |
| 6,237,990 | B1 | 5/2001 | Barbier et al. |
| 6,357,821 | B1 * | 3/2002 | Maj et al. ............. 296/193.09 |
| 6,502,653 | B1 * | 1/2003 | Balzer et al. ............ 180/68.4 |
| 6,679,545 | B1 * | 1/2004 | Balzer et al. .......... 296/193.09 |
| 6,682,804 | B2 | 1/2004 | Orndorff, Jr. |
| 6,761,395 | B2 * | 7/2004 | Charbonnel ................. 296/208 |
| 6,796,604 | B2 * | 9/2004 | Igura et al. ............. 296/193.03 |
| 6,805,400 | B2 * | 10/2004 | Bruderick et al. ..... 296/193.09 |
| 6,854,792 | B2 * | 2/2005 | Tsukahara ............... 296/203.02 |
| 6,880,883 | B2 | 4/2005 | Decker et al. |
| 6,923,495 | B2 * | 8/2005 | Kishikawa et al. .... 296/193.09 |
| 7,207,617 | B2 * | 4/2007 | Pelini .......................... 296/29 |
| 2005/0112388 | A1 | 5/2005 | Watanabe et al. |
| 2005/0134093 | A1 | 6/2005 | Borkowski et al. |
| 2005/0137291 | A1 | 6/2005 | Schneider |
| 2005/0211484 | A1 | 9/2005 | Ellerman |
| 2005/0229530 | A1 | 10/2005 | Schmidt et al. |

\* cited by examiner

*Primary Examiner*—Dennis H. Pedder
*Assistant Examiner*—Mike Hernandez
(74) *Attorney, Agent, or Firm*—Raymond Coppiellie; Dickinson Wright PLLC (57) ABSTRACT

A lightweight integral corrosion-resistant front-end structure ("front-end structure") includes a one-piece composite structure, a metal insert, and a series of washers. The one-piece composite structure is formed from a polymer-composite with a washer fluid reservoir, a tray, and/or a wheel housing. The metal insert is coated with the one-piece composite structure and isolated from corrosive substances. The metal insert is attached to a radiator support member and/or a hood pivot member. The washers offset the metal insert from the radiator support member and/or hood pivot member so as to eliminate a galvanic potential. The washers are attached to the metal insert by the one-piece composite structure.

20 Claims, 7 Drawing Sheets

LIGHTWEIGHT INTEGRAL CORROSION-RESISTANT FRONT-END STRUCTURE FOR A VEHICLE

TECHNICAL FIELD

The present invention relates generally to front-end structures for vehicles, and more particularly to a lightweight, integral, corrosion-resistant front-end structure with a shorter manufacturing cycle time and lower costs, as compared with conventional front-end structures.

BACKGROUND

Existing inner fender structures include a high number of steel stampings that are individually fixtured and welded together. Typically, these parts support a battery, washer fluid reservoir, air cleaner, splash shields, and fenders. The high part count can require significant in-plant processing and thus require substantial assembly time, labor, and cost. Also, steel parts can add significant weight to the vehicle and adversely affect its performance.

It is desirable to provide a lightweight, integral, corrosion-resistant front-end structure that enhances vehicle performance, minimizes assembly time, decreases labor, and reduces costs associated therewith.

SUMMARY OF THE INVENTION

A lightweight, integral, corrosion-resistant front-end structure ("front-end structure") for a vehicle is provided. The front-end structure includes a one-piece composite structure, a metal insert, and a series of washers. The one-piece composite structure is formed from a polymer-composite with a washer fluid reservoir, a tray, and/or a wheel housing. The metal insert is incorporated within the one-piece composite structure for reinforcing the same and isolating the metal insert from corrosive substances. The metal insert is attached to a radiator support frame and/or a hood. The washers offset the metal insert from the radiator support frame and/or hood so as to eliminate the galvanic potential and prevent corrosion of the insert. The washers are attached to the metal insert by the one-piece composite structure.

One advantage of the invention is that a front-end structure is provided that has substantially fewer parts as compared with conventional front-end structures.

Another advantage of the invention is that a front-end structure is provided that decreases assembly time and costs.

Yet another advantage of the invention is that a front-end structure is provided that has a substantially lower weight as compared with conventional front-end structures.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

In the following figures, the same reference numerals are used to identify the same components in the various views.

Figure 1A:
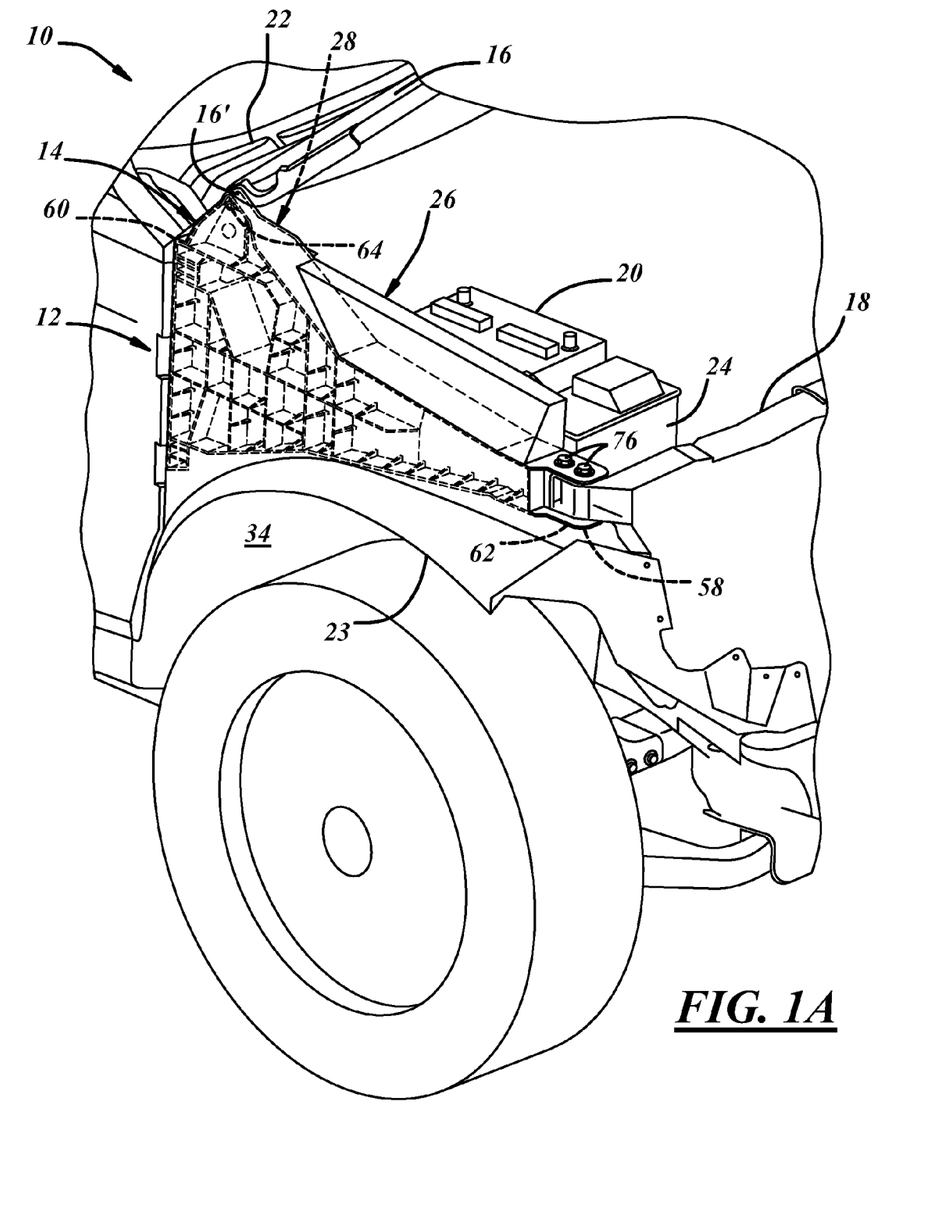
FIG. 1A is an outboard perspective view of a vehicle having a lightweight corrosion-resistant integral front-end structure, according to one embodiment of the invention.
Figure 1B:
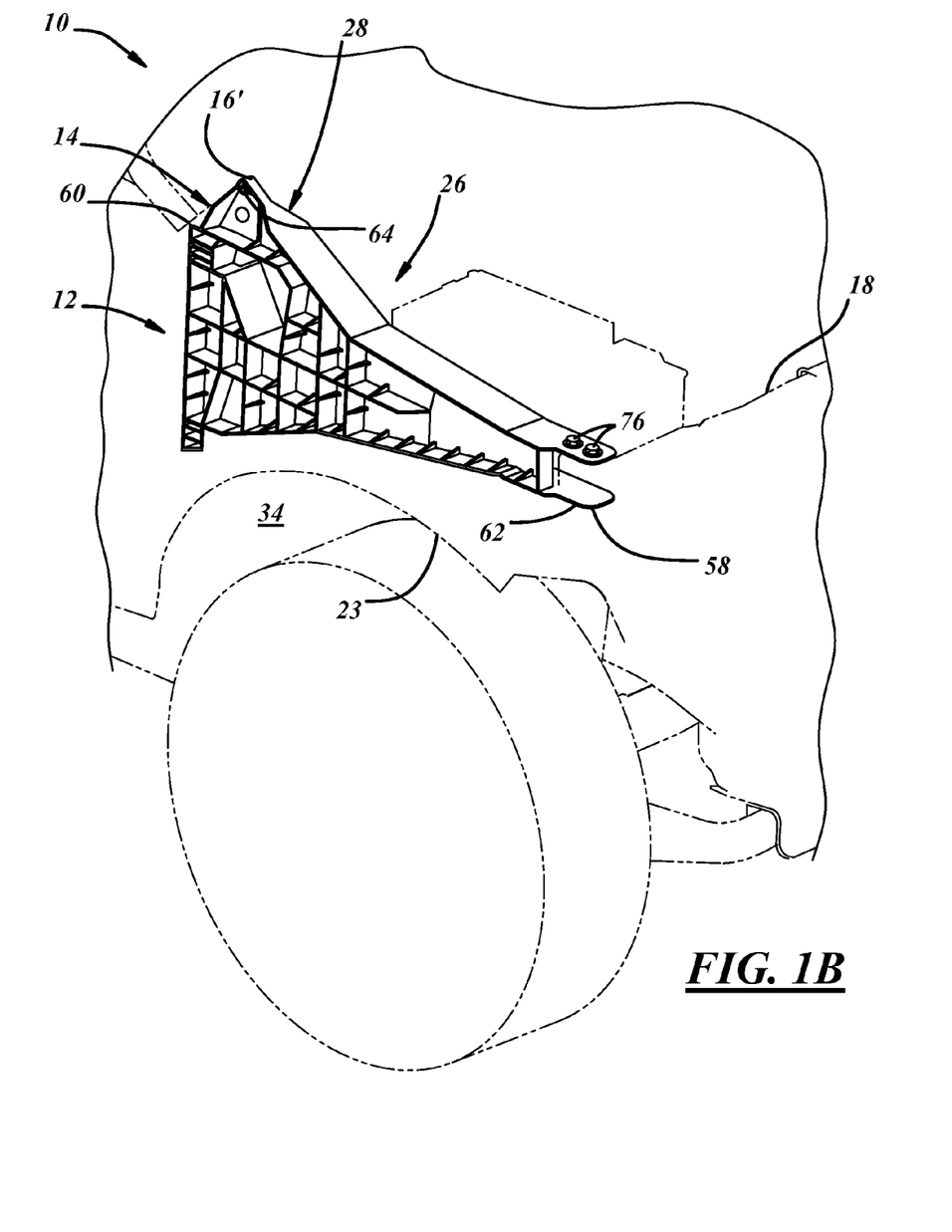
FIG. 1B is a cutaway view of the front-end structure drawn in FIG. 1A, illustrating a metal insert.

Referring to FIG. 1, there is illustrated a vehicle 10 having a front-end assembly 12 with a lightweight integral corrosion-resistant front-end structure 14 ("integral front-end structure"), according one embodiment of the invention. Integral front-end structure 14 has substantially fewer parts than conventional front-end structures. For this reason, integral front-end structure 14 reduces in-plant processing time, labor, and costs. In addition, the lightweight construction improves overall vehicle performance, including fuel economy, acceleration, and braking distance.

In the illustrated embodiment, front-end assembly 12 includes integral front-end structure 14, hood 16, radiator support frame 18, battery 20, cowl sheet metal 22, fender 23 and washer fluid reservoir 24. As detailed below, the integral front-end structure 14 provides a universal locating structure for positioning the hood 16, radiator support frame 18, battery 20, cowl sheet metal 22, fender 23, and washer fluid reservoir 24. In this way, integral front-end structure 14 eliminates the significant amount of fixturing typically associated with multiple-part front-end structures. Also, integral front-end structure 14 has a substantially lower weight, as compared with conventional steel front-end structures, which can require overlapping material for fastening multiple parts together.

As shown in FIGS. 3 through 7, integral front-end structure 14 has a substantially lightweight construction including a one-piece composite structure 26 and a one-piece metal insert 28. It is contemplated that metal insert 28 can be formed from two or more parts as desired. In this embodiment, composite structure 26 includes graphite fibers 26'. However, it is contemplated that composite structure 28 can instead be formed from carbon fibers, glass fibers, other suitable materials or any combination thereof. Metal insert 28 is formed from magnesium. It is understood that the metal insert 28 can instead be formed from aluminum, an alloy, or various other suitable lightweight metals.

Figure 2:
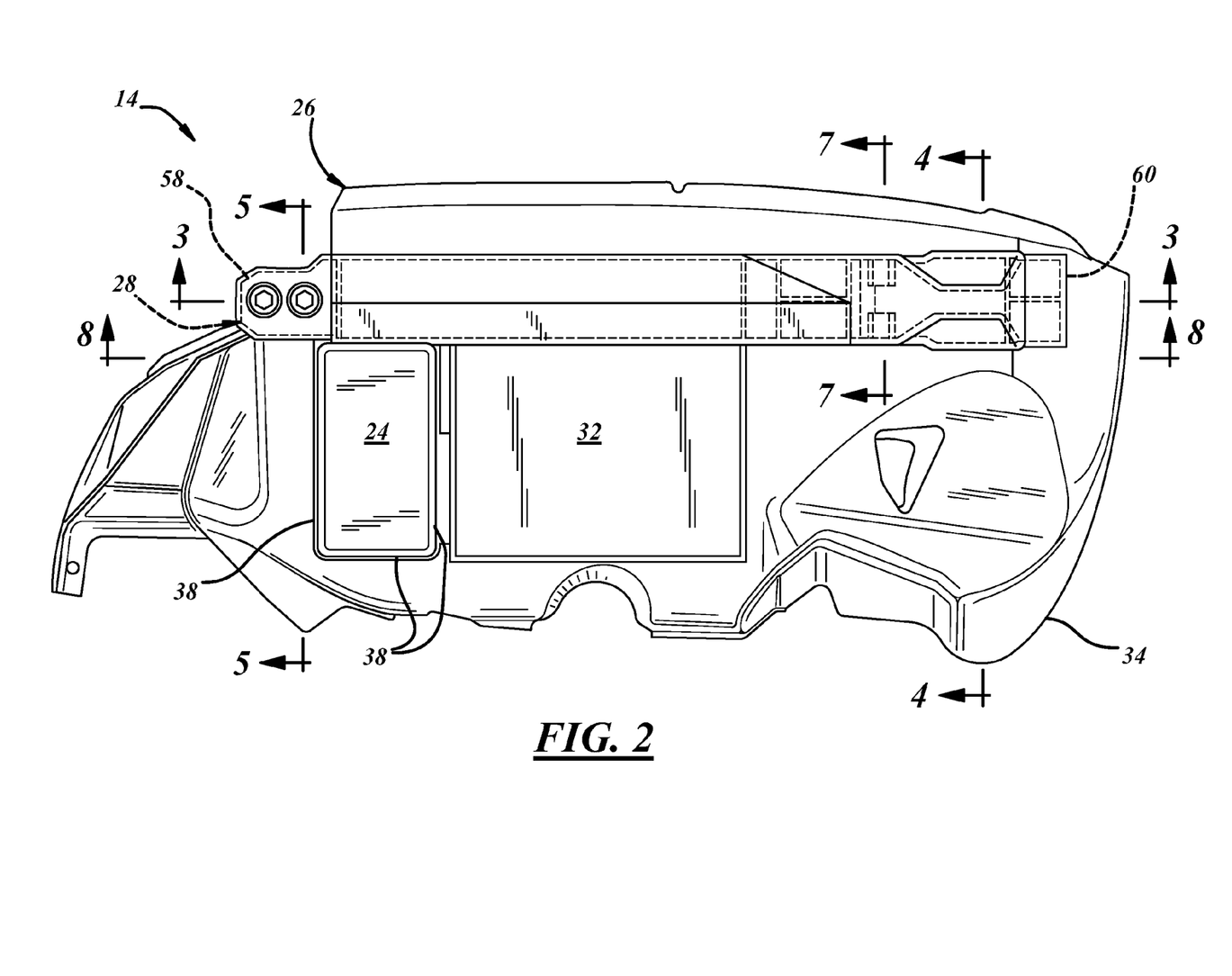
FIG. 2 is a top plan view of the front-end structure shown in FIG. 1A.
Figure 6:
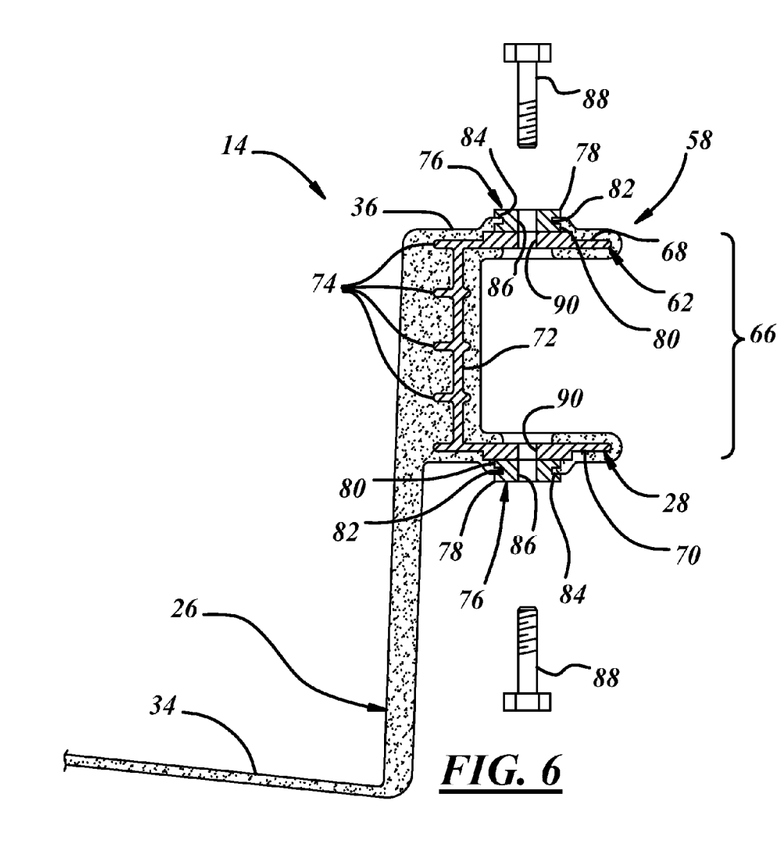
FIG. 6 is an enlarged view of the front-end structure shown in FIG. 5 encircled within circle 6.
Figure 7:
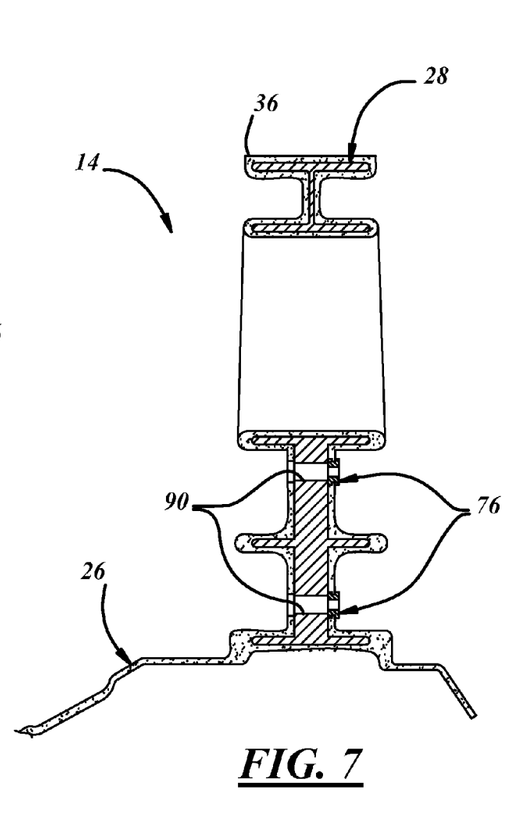
FIG. 7 is a forward cross-sectional view of the front-end structure shown in FIG. 2, as taken along line 7-7.
Figures 8, 9:
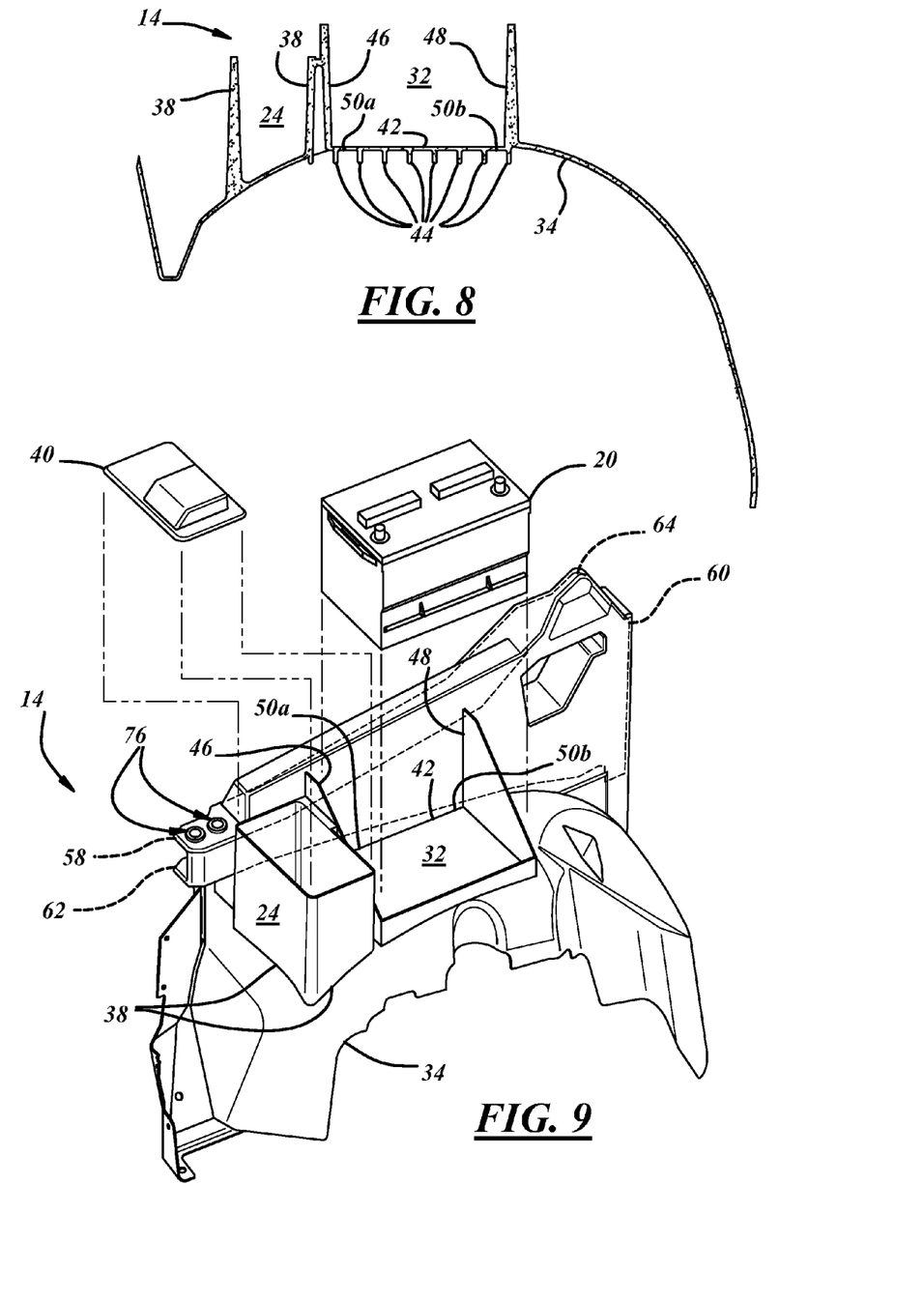
FIG. 8 is an outboard cross-sectional view of the front-end structure shown in FIG. 2, as taken along line 8-8 and illustrating the front-end structure having a one-piece composite structure formed with a washer fluid reservoir, a tray, and a wheel housing.
FIG. 9 is an inboard exploded view of the front-end structure shown in FIG. 1A.

With attention to FIGS. 2, 8, and 9, composite structure 26 includes a reservoir 24, tray 32, wheel housing 34, and layer 36 encapsulating metal insert 28 (best shown in FIGS. 3 through 7). Washer fluid reservoir 24 is formed from one or more walls 38 extending from wheel housing 34. Integral front-end structure 14 further includes a lid 40 (shown in FIG. 9) for attachment to the walls 38 of washer fluid reservoir 24 and sealing fluid therein. As also shown in FIG. 9, battery 20 is seated within tray 32. However, it is contemplated that item 20 can instead be a HVAC module, braking module, hydraulic module, or various electronic modules instead be seated within tray 32. In the illustrated embodiment, tray 32 is defined by a substantially planar portion 42 of wheel housing 34 with a series of strengthening ribs 44 reinforcing the planar portion 42 (best shown in FIG. 8). Tray 32 further includes a forward support wall 46 and a rear support wall 48 extending from opposing sides 50a, 50b of planar portion 42. Wheel housing 34 has a generally arcuate construction extending from washer fluid reservoir 24 and tray 32. In the embodiment shown in FIGS. 3 through 7, the layer 36 encapsulates metal insert 28 and protects the insert 28 from corrosive substances.

Figure 3:
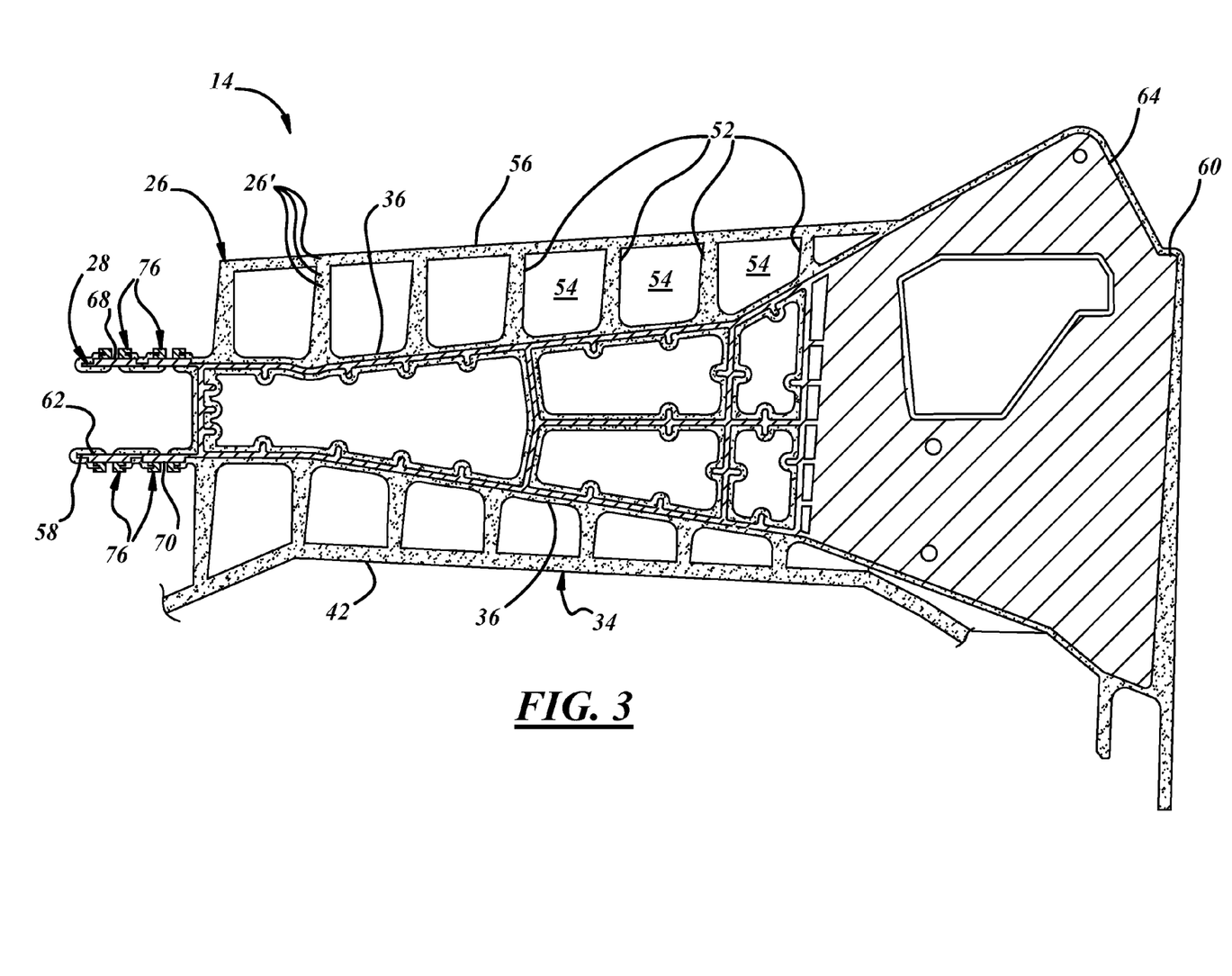
FIG. 3 is an outboard cross-sectional view of the front-end structure shown in FIG. 2, as taken along line 3-3 and illustrating the front-end structure having a metal insert coated with the one-piece composite structure.

As best shown in FIG. 3, one-piece composite structure 26 includes a series of internal reinforcing walls 52 defining internal cavities 54. This feature is beneficial for strengthening the lightweight construction. In this embodiment, reinforcing walls 52 extend between wheel housing 34 and the layer 36 encapsulating metal insert 28. These internal reinforcing walls 52 also extend between layer 36 and a top portion 56 of insert 28, which is distal to wheel housing 34 and utilized for attaching fender 23 or other suitable structure.

Metal insert 28 has a front end 58 and an opposing rear end 60, respectively with a radiator support member 62 and a hood pivot member 64. Radiator support member 62 is attached to radiator support frame 18 (shown in FIG. 1). As shown in FIG. 6, radiator support member 62 has a C-shaped lateral cross-section 66 adapted for use in a right-hand vehicle structure. It is contemplated that radiator support member 62 can have an inverted C-shaped lateral cross-section 66 for use in a left-handed vehicle structure. In this regard, metal insert 28 is readily adapted for use in left-hand and right-hand applications.

The C-shaped lateral cross-section 66 includes a top lateral flange portion 68, a bottom lateral flange portion 70, and a vertical flange portion 72 extending therebetween. In this embodiment, vertical flange portion 72 is formed with a series of reinforcing ribs 74. Also, top and bottom flange portions 68, 70 have washers 76 offsetting radiator support frame 18 from metal insert 28. The washers 76 are formed from aluminum and are utilized to separate a perimeter surface 28' of metal insert 28 from radiator support frame 18, thus eliminating the galvanic potential and preventing corrosion of metal insert 28.

Each washer 76 has a first annular flange 78, a second annular flange 80, and an annular groove 82 therebetween. Second annular flange 80 is sandwiched between metal insert 28 a portion 84 of one-piece composite structure 26 so as to attach washer 76 to metal insert 28. In this respect, annular groove 82 receives portion 84 of one-piece composite structure 26. First annular flange 78 contacts radiator support frame 18 and offsets the same from metal insert 28. First annular flange 78 is also beneficial for preventing composite structure 26 from being crushed, cracked, or otherwise damaged between radiator support frame 66 and metal insert 28. Each washer 76 defines an opening 86 for receiving a bolt member 88 that attaches radiator support member 62 to one-piece metal insert 28. Likewise, one-piece metal insert 28 defines a series of holes 90 aligned with washers 76 for receiving bolt members 88 and mounting to radiator support frame 18.

Figure 4:
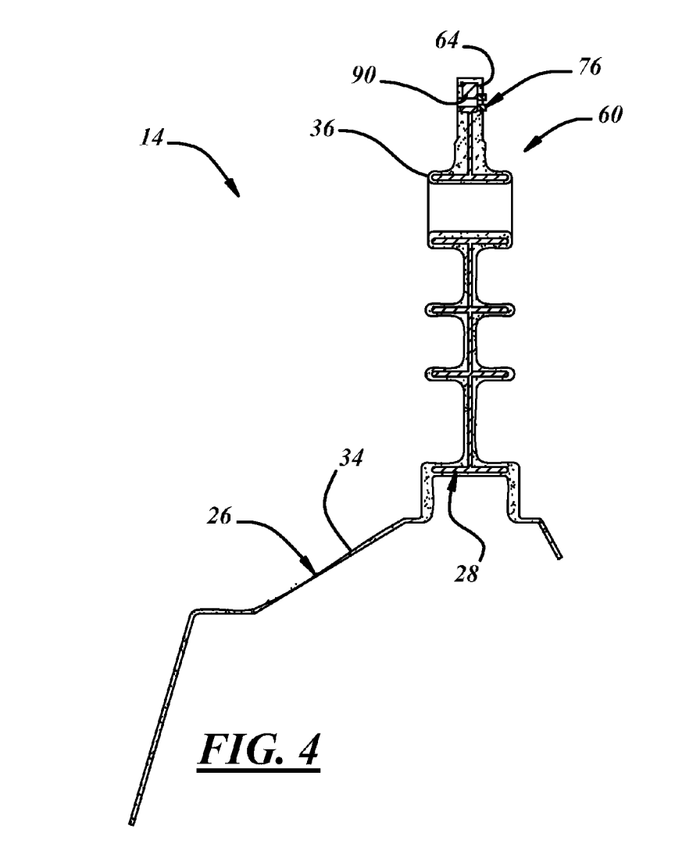
FIG. 4 is a forward cross-sectional view of the front-end structure shown in FIG. 2, as taken along line 4-4 and illustrating the metal insert having a rear-end portion with a hood hinge pivot member for attachment to a hood.
Figure 5:
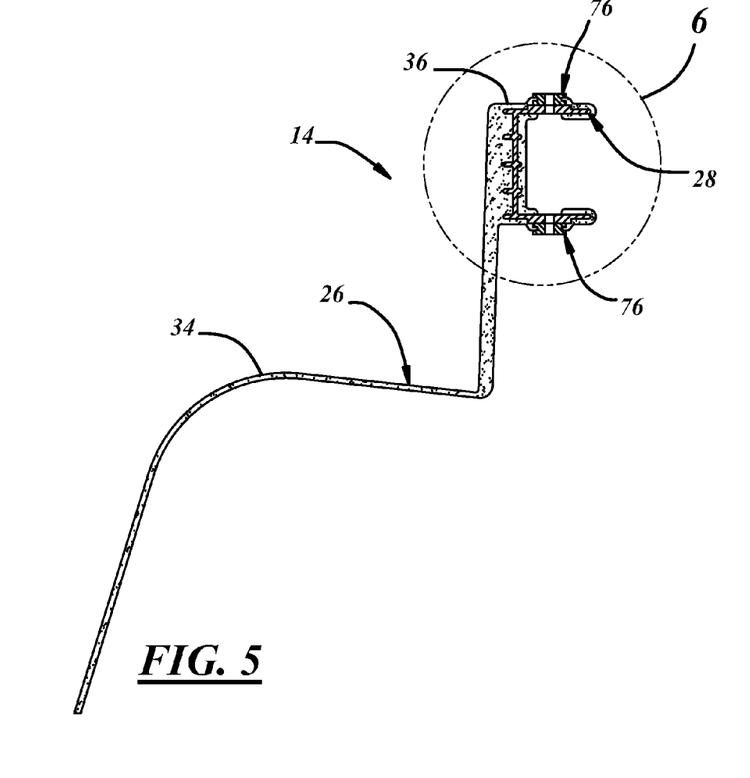
FIG. 5 is a forward cross-sectional view of the 5-5 and illustrating the metal insert having a front-end portion for attachment to a radiator support frame.

Referring to FIG. 4, hood pivot member 64 on the rear end 60 of metal insert 28 has a washer 76 and hole 90 for attachment to the hood 16 (shown in FIG. 1) and preventing corrosion of the rear end 60 of metal insert 28.

As exemplified in FIG. 7, other portions of metal insert 28 can include washers 76 and holes 90 for attachment of the fender 23.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A lightweight integral corrosion-resistant front-end structure for a vehicle, comprising:
    a one-piece composite structure formed from a polymer-composite and defining at least one of a washer fluid reservoir, a tray, and an arcuate wheel housing;
    a metal insert incorporated within said one-piece composite structure and isolated from corrosive substances;
    said metal insert having a pair of opposing ends with at least one of a radiator support member and a hood pivot member; and
    a series of washers offsetting said metal insert from a radiator support frame and a hood so as to eliminate a galvanic potential and prevent corrosion of said metal insert;
    said series of washers attached to said one-piece metal insert by said one-piece composite structure.

2. The lightweight integral corrosion-resistant front-end structure recited in claim 1 wherein said one-piece composite structure is formed from a material selected from the group consisting of glass, graphite, and carbon.

3. The lightweight integral corrosion-resistant front-end structure recited in claim 1 wherein each of said washers is formed from aluminum.

4. The lightweight integral corrosion-resistant front-end structure recited in claim 1 wherein each of said washers has a first annular flange, a second annular flange, and an annular groove therebetween.

5. The lightweight integral corrosion-resistant front-end structure recited in claim 4 wherein said second annular flange is sandwiched between a portion of said one-piece composite structure and said metal insert.

6. The lightweight integral corrosion-resistant front-end structure recited in claim 5 wherein said annular groove receives said portion of said one-piece composite structure.

7. The lightweight integral corrosion-resistant front-end structure recited in claim 1 wherein said metal insert is a frame supporting said one-piece composite structure and including a series of reinforcing ribs.

8. A front-end assembly for a vehicle, comprising:
    said lightweight integral corrosion-resistant front-end structure recited in claim 1;
    a hood pivotally attached to said hood pivot member;
    a radiator support frame attached to said radiator support member; and
    a body-side structure attached to said lightweight integral corrosion-resistant front-end structure.

9. The front-end assembly recited in claim 8 wherein said one-piece composite structure is formed from a material selected from the group consisting of glass, graphite, and carbon.

10. The lightweight integral corrosion-resistant front-end structure recited in claim 8 wherein each of said washers is formed from aluminum.

11. The front-end assembly recited in claim 8 wherein each of said washers has a first annular flange, a second annular flange, and an annular groove therebetween.

12. The front-end assembly recited in claim 11 wherein said second annular flange is sandwiched between a portion of said one-piece composite structure and said metal insert.

13. The front-end assembly recited in claim 12 wherein said annular groove receives said portion of said one-piece composite structure.

14. The front-end assembly recited in claim 11 wherein said first annular flange is sandwiched between said one-piece composite structure and one of said radiator support frame, said hood, and said body-side structure.

15. The front-end assembly recited in claim 8 wherein said metal insert is a frame supporting said one-piece composite structure and including a series of reinforcing ribs.

16. A lightweight integral corrosion-resistant front-end structure for a vehicle, comprising:
   a one-piece composite structure defining at least one of a washer fluid reservoir, a tray, and an arcuate wheel housing;
   a one-piece metal insert incorporated within said one-piece composite structure and isolated from corrosive substances;
   said one-piece metal insert having a pair of opposing ends with at least one of a radiator support member and a hood pivot member; and
   a series of washers offsetting said one-piece metal insert from a radiator support frame and a hood so as to eliminate a galvanic potential and prevent corrosion of said one-piece metal insert;
   said series of washers attached to said one-piece metal insert by said one-piece composite structure.

17. The lightweight integral corrosion-resistant front-end structure recited in claim 14 wherein said one-piece metal insert is a frame having a perimeter surface supporting said one-piece composite structure.

18. The lightweight integral corrosion-resistant front-end structure recited in claim 16 wherein said frame has rear end portion and a front end portion, with said front end portion having a C-shaped lateral cross-section adapted for use in one of a right-hand vehicle structure and a left-hand vehicle structure.

19. A lightweight integral corrosion-resistant front-end structure for a vehicle, comprising:
   a one-piece composite structure defining at least one of a washer fluid reservoir, a tray, and an arcuate wheel housing;
   a metal insert incorporated within said one-piece composite structure;
   said metal insert formed from a material selected from the group consisting of magnesium and aluminum;
   said one-piece metal insert having a pair of opposing ends with at least one of a radiator support member and a hood pivot member; and
   a series of washers offsetting said metal insert from a radiator support frame and a hood so as to eliminate a galvanic potential and prevent corrosion of said metal insert;
   said series of washers comprised of aluminum;
   said series of washers attached to said one-piece metal insert by said one-piece structure.

20. The lightweight integral corrosion-resistant front-end structure recited in claim 19 wherein said one-piece metal insert is a frame having a perimeter surface supporting said one-piece composite structure.

* * * * *